United States Patent Office.

STEPHEN MOULTON, OF BRADFORD-ON-AVON, ENGLAND.

Letters Patent No. 94,631, dated September 7, 1869; patented in England, May 9, 1868.

IMPROVED PRINTERS' INKING-ROLLER FROM RUBBER-SPONGE.

The Schedule referred to in these Letters Patent and making part of the same.

*To all whom it may concern:*

Be it known that I, STEPHEN MOULTON, of Bradford-on-Avon, England, have invented or discovered certain new and useful "Improvements in the treatment of vulcanized or cured India rubber, for obtaining a substance of a mossy nature suitable for Printers' Inking-Rollers, cushions, and other articles;" and I do hereby declare that the following is a full, true, and exact description thereof; that is to say—

This invention has for its object improvements in the treatment of vulcanized or cured India rubber, for the purpose of obtaining a substance of a mossy nature, suitable for forming the body of printers' inking-rollers, cushions, and other articles.

The mode or manner in which the same is effected is as follows:

I take the well-known article, vulcanized or cured India rubber, with or without its containing any foreign admixture except sulphur, and grind or reduce it to powder or dust. I then subject it to a second vulcanizing-heat, the powder or dust being placed (previous to this second vulcanizing) in a suitable mould, according to the particular form or shape of the article required.

If the article to be moulded be, say a printers' inking-roller, I put the powder or dust into a suitable hollow cylinder, with the iron spindle for the centre of the roller therein. When the powder or dust has become converted by the vulcanizing-heat into a homogeneous mossy substance, I cover it with a skin of rubber and sulphur, with or without other compounds, and then again subject the whole to a vulcanizing-heat, in order to vulcanize or cure the rubber skin. The roller is then ready for use.

For some purposes the moss rubber may be covered on one or both sides with sheet-rubber, cotton cloth, or other suitable fabric, or it may be left uncovered, according to the article to which it is to be applied.

What I claim, and desire to secure by Letters Patent, is—

1. Treating vulcanized or cured India rubber substantially in the manner hereinbefore described, in order to obtain a substance of a mossy nature suitable for the purposes aforesaid.

2. The application of India rubber, in a mossy or spongy form, to the manufacture of printers' inking-rollers, as set forth.

3. An inking-roller, the body of which is composed of India rubber, in the form of a mossy or spongy substance, and the external surface of a coating or skin of solid rubber, either vulcanized or not, substantially as set forth.

4. Also, the combination of India rubber of a spongy or mossy nature, with a surface or filament of ordinary sheet-rubber, either vulcanized or not, or of fibrous or textile material alone, or combined with rubber, substantially as set forth.

In witness whereof, I, the said STEPHEN MOULTON, have hereunto set my hand, this 14th day of June, 1869.

STEPH. MOULTON.

Witnesses:
A. E. MOULTON, *Bradford-on-Avon.*
H. MOULTON, *Bradford-on-Avon.*